US009864732B2

(12) United States Patent
Kovar

(10) Patent No.: US 9,864,732 B2
(45) Date of Patent: Jan. 9, 2018

(54) USER INTERFACES THAT FACILITATE MANAGEMENT OF FORMATTING OF DIGITAL CONTENT

(71) Applicant: Google Inc., Mountain View, CA (US)

(72) Inventor: Lucas Adam Kovar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 15/143,757

(22) Filed: May 2, 2016

(65) Prior Publication Data

US 2017/0315962 A1    Nov. 2, 2017

(51) Int. Cl.
G06F 3/0484      (2013.01)
G06F 17/21       (2006.01)
H04L 29/08       (2006.01)

(52) U.S. Cl.
CPC ........ G06F 17/211 (2013.01); G06F 3/04847 (2013.01); H04L 67/02 (2013.01)

(58) Field of Classification Search
None
See application file for complete search history.

(56) References Cited

U.S. PATENT DOCUMENTS

| | | | |
|---|---|---|---|
| 9,219,619 B2 | 12/2015 | Mayers et al. | |
| 2015/0095768 A1* | 4/2015 | Rimmer | G06F 17/211 715/238 |
| 2015/0212715 A1 | 7/2015 | Singhal et al. | |
| 2015/0212985 A1* | 7/2015 | Khambanonda | G06F 17/2247 715/238 |
| 2016/0048483 A1 | 2/2016 | Baldwin et al. | |
| 2016/0071237 A1* | 3/2016 | Baldwin | G06F 3/04845 715/236 |
| 2016/0117308 A1* | 4/2016 | Haider | G06F 17/246 715/217 |
| 2017/0103430 A1* | 4/2017 | Gilbert | G06Q 30/0277 |

* cited by examiner

*Primary Examiner* — Asher Kells
(74) *Attorney, Agent, or Firm* — Fish & Richardson P.C.

(57) ABSTRACT

Methods, systems, and apparatus, including computer programs encoded on a computer storage medium, for generating a user interface that includes a viewport space of a digital content item; generating, based on user input, breakpoints of the viewport space based on a height, a width, or an aspect ratio of the viewport space; based on the breakpoints, generating formatting rules that each create a different version of the digital content item when the formatting rule is applied; and distributing, to a client device, the digital content item for display within an electronic document, including providing i) text or image content of the digital content item and ii) the formatting rules, wherein the formatting rules cause a client-side application to dynamically render and display an appropriate version of the digital content item based on the formatting rules and a size of a display area in which the digital content item is presented.

20 Claims, 11 Drawing Sheets

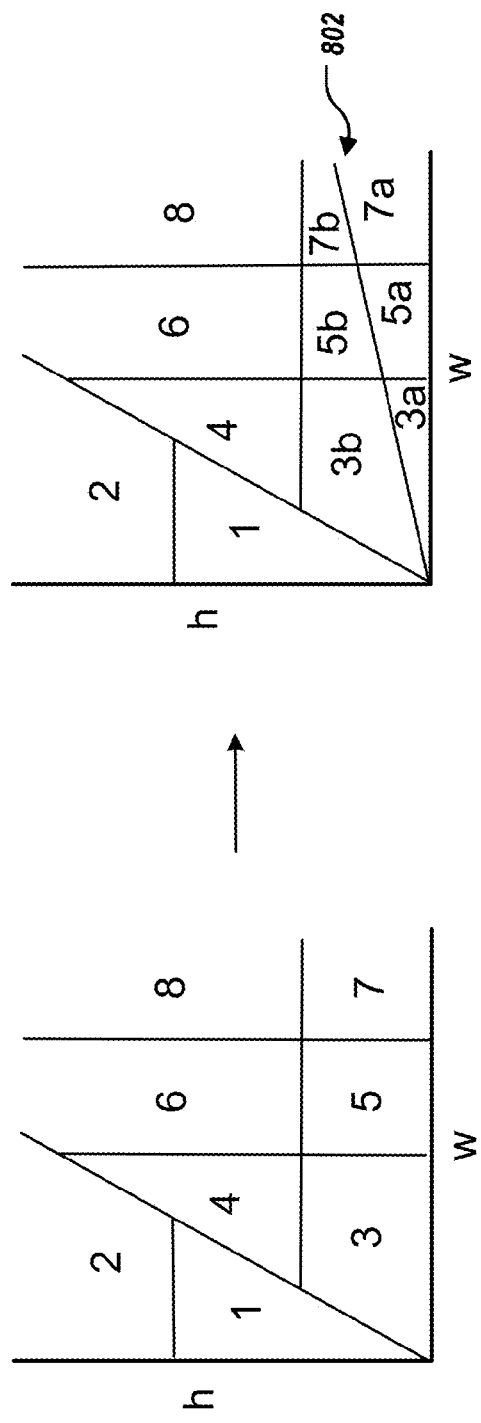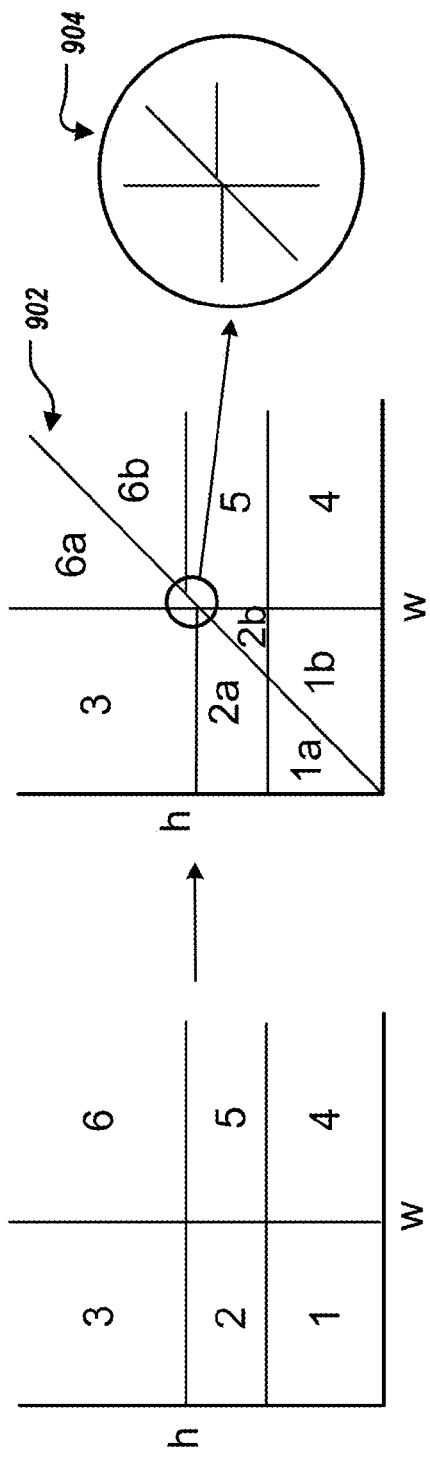
FIG. 8
FIG. 9

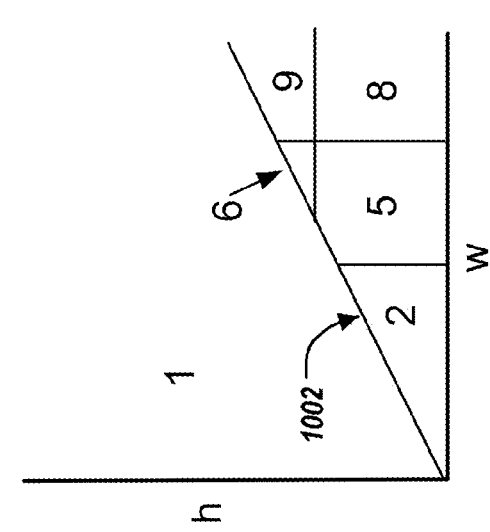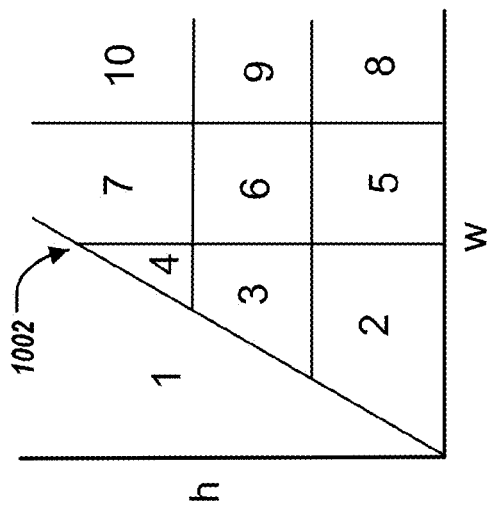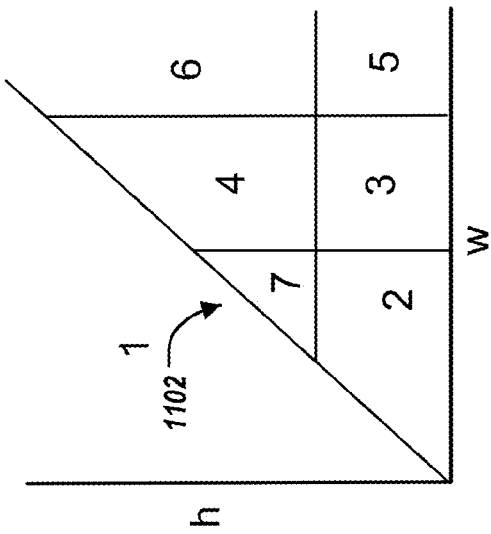
FIG. 10
FIG. 11

USER INTERFACES THAT FACILITATE MANAGEMENT OF FORMATTING OF DIGITAL CONTENT

BACKGROUND

This document discloses user interfaces that facilitate management of formatting across multiple aspect ratios. Digital content is distributed to a wide variety of client devices. For example, a large amount of digital content is distributed to portable computing devices, such as mobile phones, tablet devices, and other portable computing devices. Often, the digital content distributed to these portable devices is transmitted over wireless connections, including mobile phone networks (e.g., cellular communications networks).

SUMMARY

Innovative aspects of the subject matter described in this specification may be embodied in methods that include the actions of generating, by one or more servers, a user interface that includes a viewport space of a digital content item; receiving, by the one or more servers and through the user interface, user input; generating, by the one or more severs and based on the user input, one or more breakpoints of the viewport space based on a height, a width, or an aspect ratio of the viewport space; based on the one or more breakpoints, generating, by the one or more servers, two or more formatting rules that each create a different version of the digital content item when the formatting rule is applied, wherein different ones of the two or more formatting rules are applied for different sized viewport spaces; and distributing, by the one or more servers and to a given client device, the digital content item for display within an electronic document, including providing, to the given client device, i) text or image content of the digital content item and the ii) the two or more formatting rules, wherein the two or more formatting rules cause a client-side application to dynamically render and display an appropriate version of the digital content item based on the two or more formatting rules and a size of a display area in which the digital content item is presented.

Other embodiments of these aspects include corresponding systems, apparatus, and computer programs, configured to perform the actions of the methods, encoded on computer storage devices.

These and other embodiments may each optionally include one or more of the following features. For instance, at least one of the breakpoints is based on the width of the viewport space. The one or more breakpoints include respective breakpoints based on height, width, and aspect ratio of the viewport space. Generating, by the one or more servers, two or more intervals of the viewport space based on the one or more breakpoints, each of the intervals independent of overlapping one another. Each of the one or more breakpoints are inclusive of a boundary established by the respective breakpoint. Generating the one or more breakpoints includes inserting a new breakpoint in the viewport space, moving a previously existing breakpoint within the viewport space, or deleting a previously existing breakpoint from the viewport space. Generating the one or more breakpoints includes adding an aspect ratio breakpoint of the viewport space based on an orientation of the digital content item, or removing a previously existing aspect ratio breakpoint of the viewport space.

Particular implementations of the subject matter described in this specification can be implemented so as to realize one or more of the following advantages. For example, simpler editing of content items as edits only need to be done once; synchronization of content and styling of a content item is shared by all versions of the content item; and simpler serving of content items.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 6-13 depict example two-dimensional representations of a viewport space.

DETAILED DESCRIPTION

This document describes methods, systems, and computer readable medium that facilitate formatting the display of digital content. For example, systems described herein generate a user interface that includes a visualization of a viewport space of a digital content item. The user interacts with the user interface to provide user input, including a desired positioning of one or more breakpoints (e.g., aspect ratios at which formatting for the digital content item will change). The system generates the breakpoints based on the user input. The breakpoints indicate a desired partitioning of the viewport space such that each partition, or interval, of the viewport space is associated with a formatting rule. The breakpoints can be based on a height, a width, and/or an aspect ratio of the viewport space. The system generates the formatting rules based on the breakpoints such that each formatting rule creates a different version of the digital content item when the formatting rule is applied. The system distributes the digital content item to a client device for display within an electronic document by the client device. The distribution includes providing to the client device text or image content of the digital content item, and the formatting rules. The formatting rules cause a client-side application to render and display the digital content item based on the formatting rules and a size of a display area in which the digital content item is to be presented.

Figure 1:
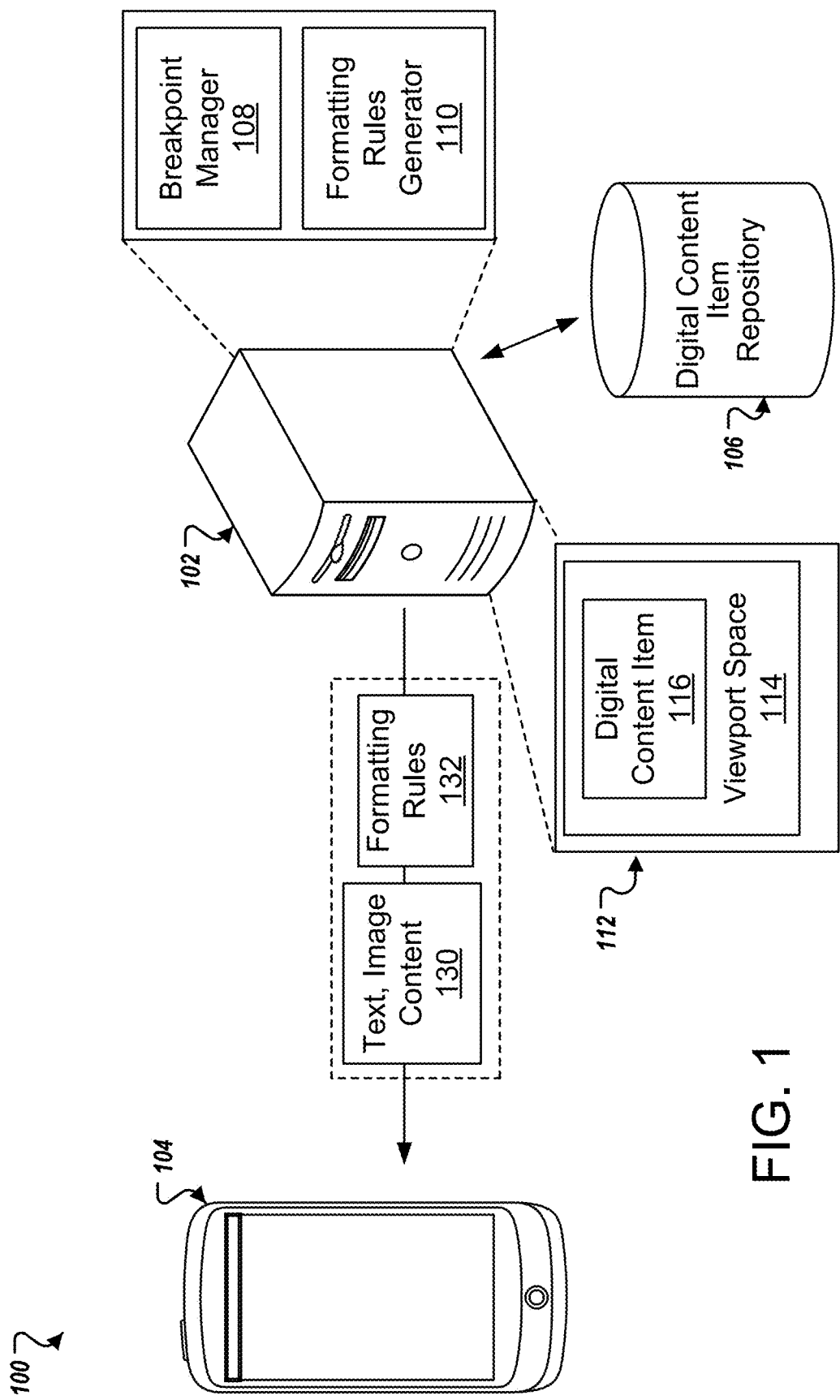
FIG. 1 depicts an example system for formatting a display of digital content.

FIG. 1 illustrates an environment 100 for formatting display of digital content items. The environment 100 includes a server computing system 102, a client computing device 104, and a digital content item repository 106. The server computing system 102 further includes a breakpoint manager 108 and a formatting rules generator 110. The client computing device 104 is in communication with the server computing system 102 over one or more networks. The server computing system 102 is in communication with the digital content item repository 106 over one or more networks.

In some implementations, the server computing system 102 generates a user interface 112 that includes a viewport space 114 of a digital content item 116. Specifically, the viewport space 114 is an area in which a representation of the digital content item 116 is rendered for display, e.g., by the server computing system 102 and/or the client computing device 104. The digital content item 116 can include any type of digital content, including text, image, and/or video. The server computing system 102 obtains the digital content item 116 for display within the viewport space 116 from the digital content item repository 106.

Figure 2:
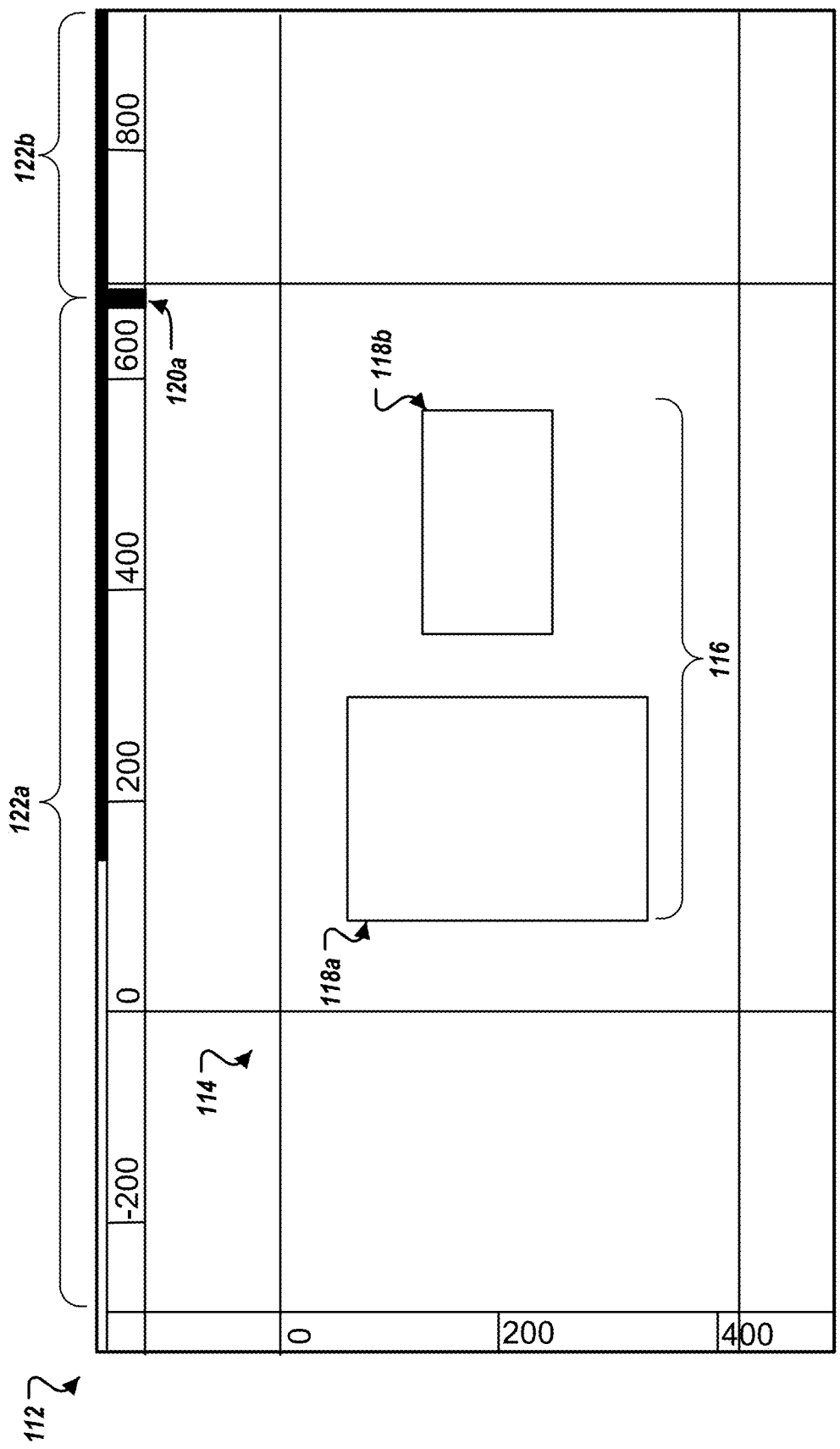
FIGS. 2-5 depict example user interfaces for providing user input related to breakpoints.

In some implementations, the server computing system 102 receives user input through the user interface 112. Specifically, a user associated with the user interface 112 interacts with the user interface 112 (e.g., input via a keyboard, a mouse, touchscreen, or other) to provide the user input. In particular, FIG. 2 illustrates the user interface 112 of FIG. 1, and specifically, a graphical representation of the viewport space 114 that includes the digital content item 116. In the illustrated example, the digital content item 116 includes a first item 118a and a second item 118b (collectively referred to as item 118). To that end, the user can interact with the viewport space 114 and/or the digital content item 116 to provide the user input. In some examples, the user input is associated with breakpoints of the viewport space 114, and specifically, inserting a breakpoint, moving a previously existing breakpoint, or deleting a breakpoint, described further below.

In some implementations, based on the user input, the server computing system 102, and specifically, the breakpoint manager 108, automatically generates one or more breakpoints of the viewport space 114. Specifically, the breakpoint manager 108 generates the breakpoint 120a based on the user input. The breakpoint 120a is associated with a partition of the viewport space 114 into two or more intervals (or partitions). In the illustrated example of FIG. 2, a user provides user input to generate the breakpoint 120a. Specifically, the viewport space 144 includes the first breakpoint 120a at a first width of the viewport space 144, e.g., at 620 pixels. The first breakpoint 120a partitions the viewport space 114 into a first interval 122a less than 620 pixels and a second interval 122b greater than 620 pixels. That is, the breakpoint 120a is based on the width of the viewport space 144.

In some implementations, based on the breakpoints, the server computing system 102, and specifically, the formatting rules generator 108, generates formatting rules that each create a different version of the digital content item 116 when the respective formatting rule is applied. That is, the formatting rules generator 108 generates two formatting rules based on the breakpoint 120a that are associated with an appropriate corresponding interval 122a, 122b. In the illustrated example of FIG. 2, a first formatting rule is associated with the first interval 122a and a second, differing formatting rule is associated with the second interval 122b. To that end, different formatting rules are applied to different-sized viewport spaces 114. For example, when a width of the viewport space 114 is less than the breakpoint 120a, e.g., less than 620 pixels, the first formatting rule is applied to the viewport space 114; and when the width of the viewport space 114 is greater than the breakpoint 120b, e.g., greater than 620 pixels, the second formatting rule is applied to the viewport space 114. In the illustrated example, the viewport space 114 is shown having a width greater than the breakpoint 120b, e.g., 620 pixels, and the second formatting rule is applied to the viewport space 114. In the example, the second formatting rule includes positioning, arrangement, and/or a size of the digital content item 116 within the viewport space 114, as well as formatting of content provided within the digital content item 116. Specifically, among other formatting aspects, the second formatting rule applied to the digital content item 116 includes the first item 118a positioned side-by-side to the second item 118b.

Figure 3:
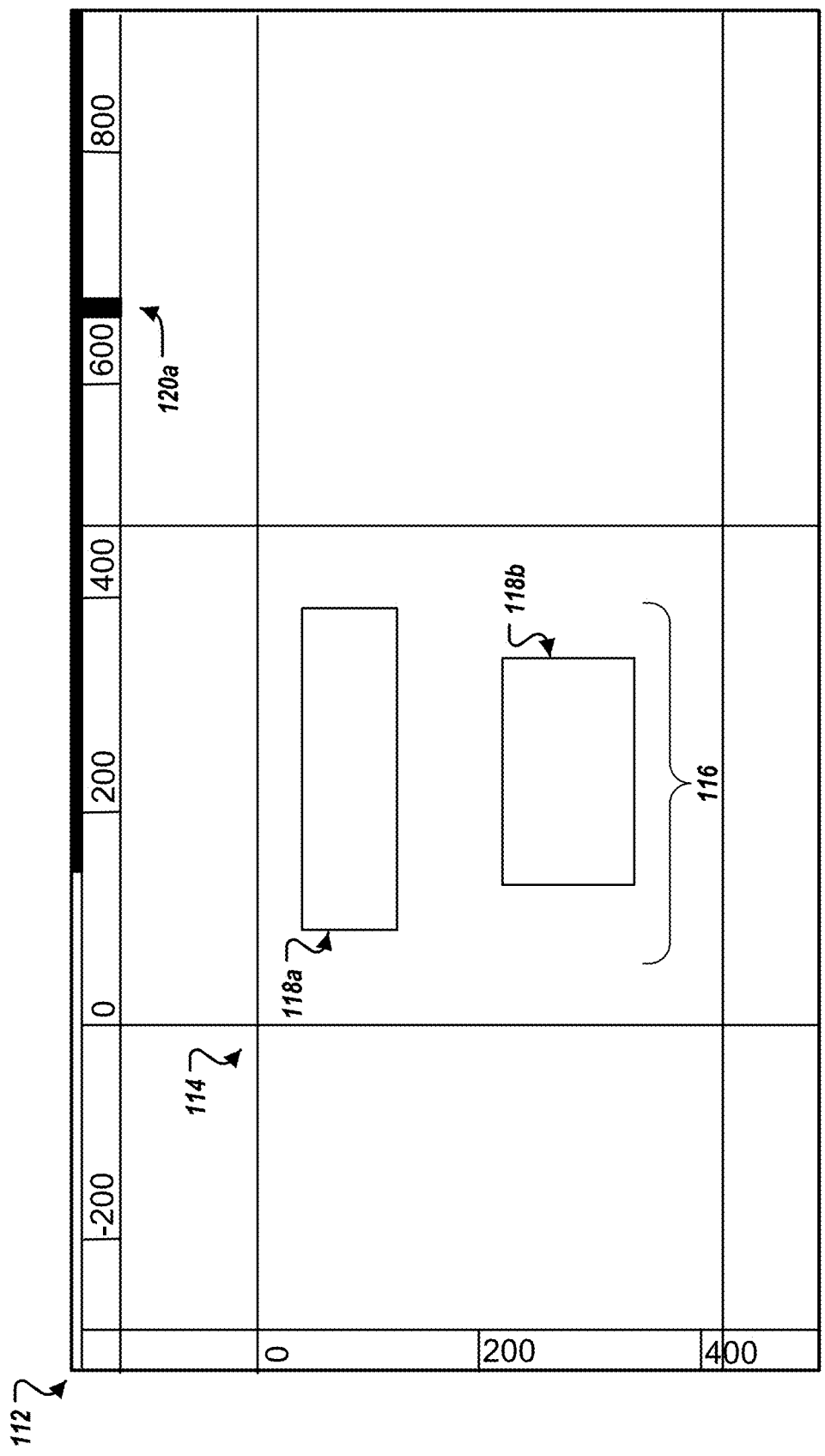

FIG. 3 illustrates the user interface 112 of FIG. 1, and specifically, the viewport space 114 having a width less than the breakpoint 120a, e.g., 620 pixels. That is, the viewport space 114 is shown with application of the first formatting rule, i.e., when the width of the viewport space 114 is less than the breakpoint 120a, e.g., less than 620 pixels. In the illustrated example, the first formatting rule includes positioning, arrangement, and a size of the digital content item 116 within the viewport space 114, as well as formatting of content provided within the digital content item 116. Specifically, among other formatting aspects, the first formatting rule includes the first item 118a positioned above the second item 118b.

Figure 4:
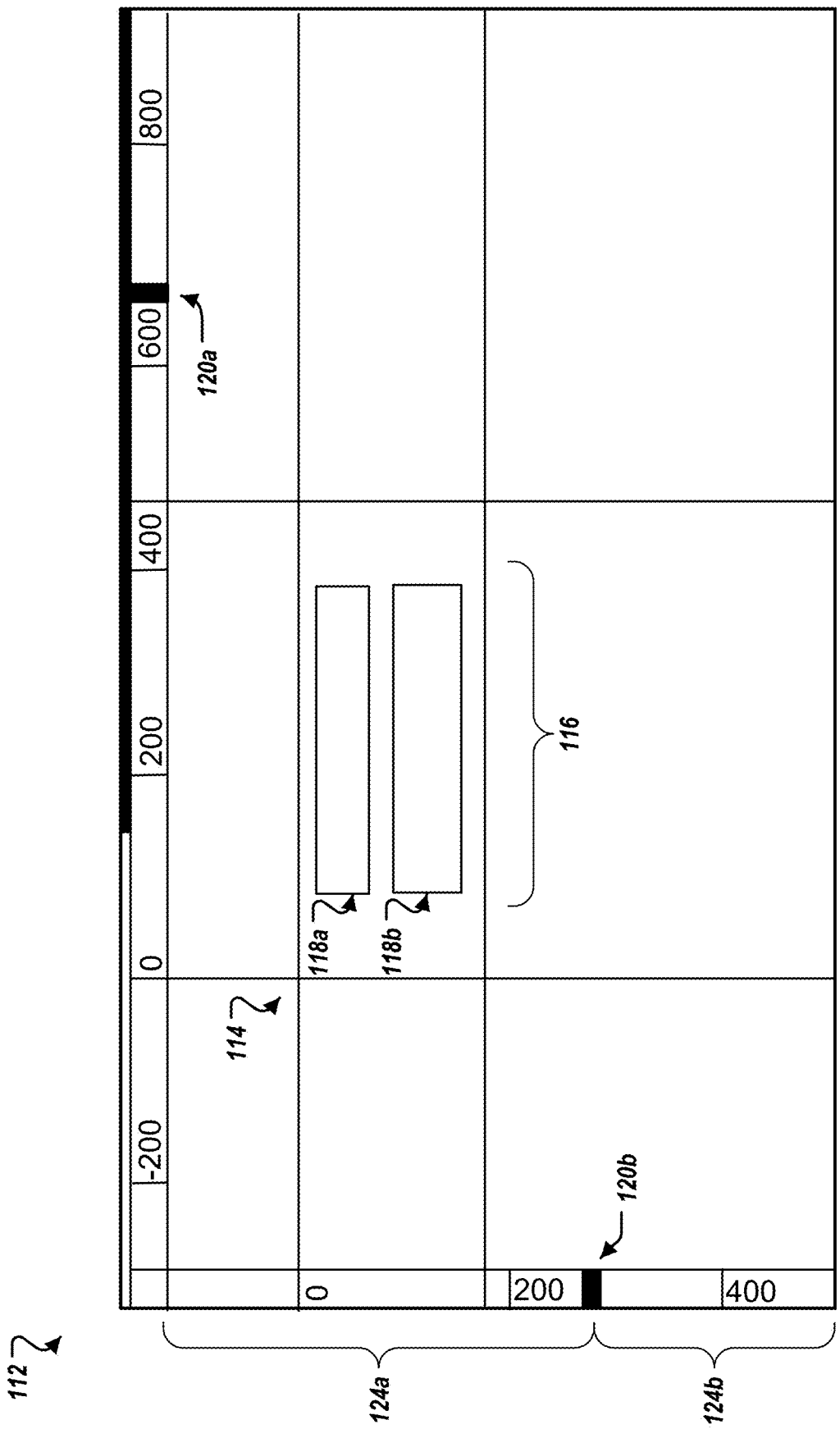

FIG. 4 illustrates the viewport space 114 including a second breakpoint 120b. Specifically, the user interacts with the viewport space 114 to provide additional user input such that the breakpoint manager 108 generates the second breakpoint 120b. The second breakpoint 120 additionally partitions the viewport space 114 into a first interval 124a less than 220 pixels and a second interval 124b greater than 220 pixels. That is, the second breakpoint 120b is based on a height of the viewport space 114.

To that end, the formatting rules generator 108 generators two formatting rules based on the second breakpoint 120b that are associated with an appropriate corresponding interval 124a, 124b. In the illustrated example of FIG. 4, a third formatting rule is associated with the first interval 124a and a fourth, differing formatting rule is associated with the second interval 124b. That is, when a height of the viewport space 114 is less than the second breakpoint 120b, e.g., less than 220 pixels, the third formatting rule is applied to the viewport space 114; and when the height of the viewport space 114 is greater than the second breakpoint 120b, e.g., greater than 220 pixels, the fourth formatting rule is applied to the viewport space 114. In the illustrated example, the viewport space 114 is shown having a height less than the second breakpoint 120b, e.g., 220 pixels, and the third formatting rule is applied to the viewport space 114. In the example, the third formatting rule includes positioning, arrangement, and a size of the digital content item 116 within the viewport space 114, as well as formatting of content provided within the digital content item 116. Specifically, among other formatting aspects, the second formatting rule includes the first item 118a positioned above the second item 118b, and a size of the items 118 are adjusted.

In some examples, the breakpoints are based on an aspect ratio of the viewport space 114. Specifically, the aspect ratio breakpoints partitions the viewport space 114 into intervals based on an aspect ratio of the viewport space 114. In some examples, the aspect ratio is associated with a proportional relationship between a height and a width of the viewport space 114. The formatting rules generator 108 generates two or more formatting rules based on the aspect ratio breakpoint that is associated with corresponding intervals, similar to that mentioned above. For example, the aspect ratio breakpoint can be established at 9/16, e.g., a relationship of the height and the width of the viewport space is 9 to 16. That is, based on an aspect ratio of the viewport space 114 with respect to the aspect ratio breakpoint, an appropriate formatting rule is applied to the viewport space 114.

In some examples, an aspect ratio breakpoint is associated with an orientation of the viewport space 114. That is, the aspect ratio breakpoint partitions the viewport space 114 into a first interval associated with a first orientation, e.g., landscape, and a second interval associated with a second orientation, e.g., portrait. In some examples, for an aspect ratio of the viewport space 114 greater than the aspect ratio breakpoint, the viewport space 114 is associated with a portrait orientation; and for an aspect ratio of the viewport space 114 less than the aspect ratio breakpoint, the viewport space 114 is associated with a landscape orientation. In some examples, the aspect ratio breakpoint is based on the client computing device 104, and specifically, based on a screen size and/or graphical user interface (GUI) size of the client computing device 104. In some examples, the breakpoints of the viewport space 114 are based on a height, a width, and an aspect ratio of the viewport space.

Figure 5:
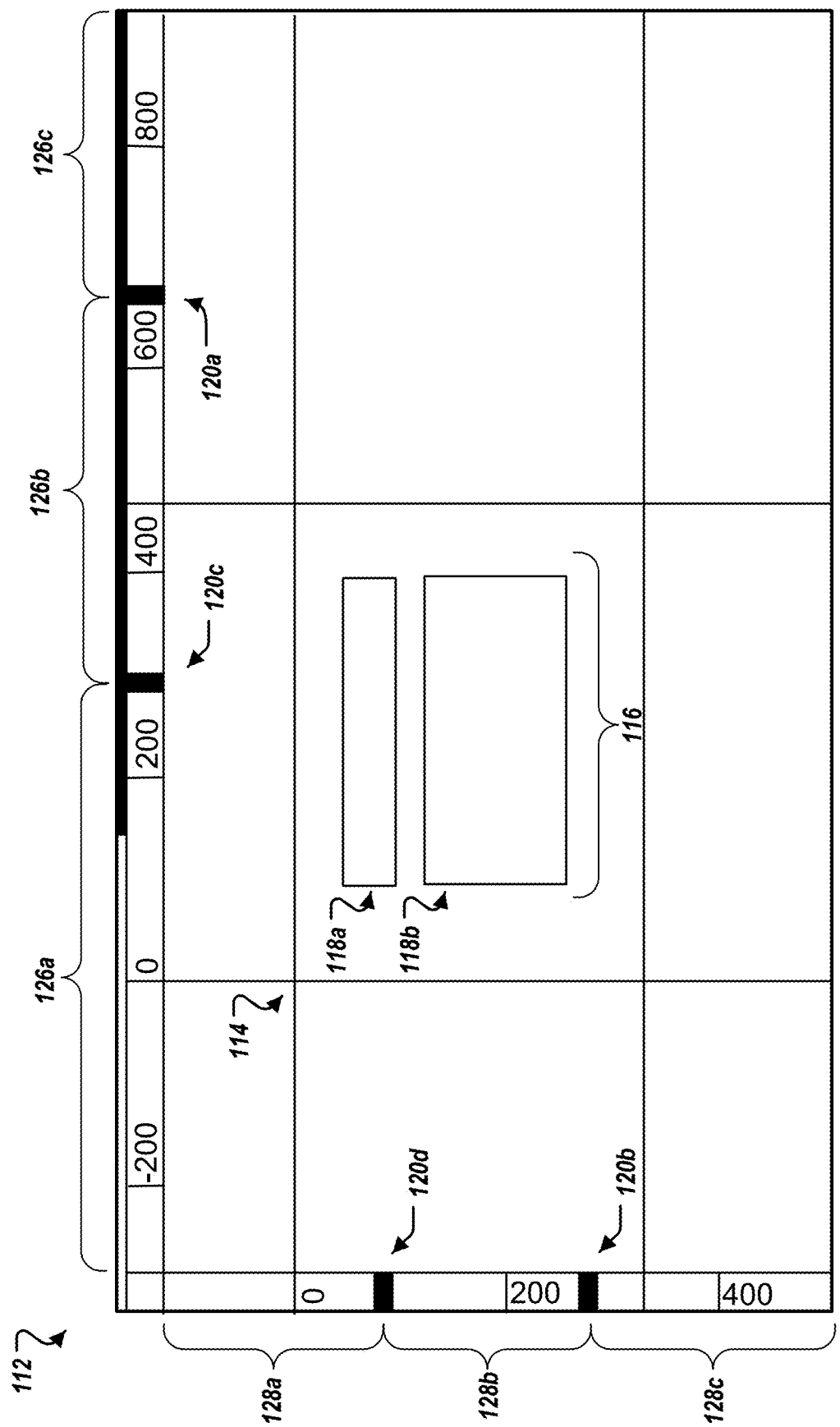

FIG. 5 illustrates the viewport space 114 including a third breakpoint 120c and a fourth breakpoint 120d. Specifically, the user interacts with the viewport space 114 to provide additional user input such that the breakpoint manager 108 generates the third breakpoint 120c and the fourth breakpoint 120d. The third breakpoint 120c partitions the viewport space 114 into a first interval 126a less than 220 pixels, a second interval 126b between 220 pixels and 620 pixels, and a third interval 126c greater than 620 pixels. The fourth breakpoint 120d partitions the viewport space 114 into a first interval 128a less than 100 pixels, a second interval 128b between 100 pixels and 220 pixels, and a third interval 128c greater than 220 pixels.

In some examples, each of the intervals generated by the server computing system 102, e.g., intervals 126a, 126b, 126c, are independent of overlapping one another. Specifically, to ensure that at most one formatting rule is applied to the viewport space 114 at a time, the intervals are independent of overlapping one another—that is, they are disjoint intervals. For example, interval 126a, 126b, 126c are independent of overlapping one another. That is, each interval 126a, 126b, 126c are separate and distinct from one another.

Figure 6:
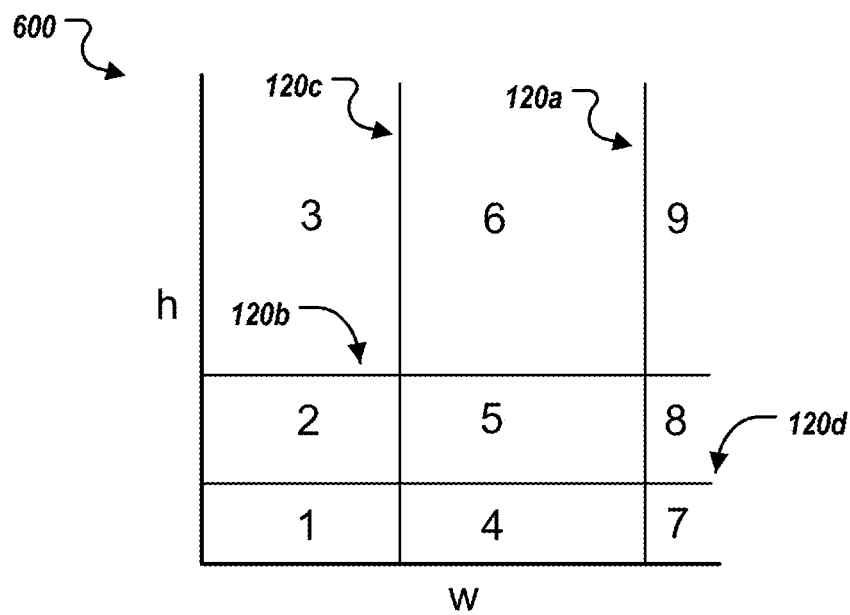

The formatting rules generator 108 generates three formatting rules based on the first breakpoint 120a and the third breakpoint 120c and that are associated with an appropriate corresponding interval 126a, 126b, 126c. In the illustrated example of FIG. 5, based on a width of the viewport space 114—less than the third breakpoint 120c, e.g., less than 220 pixels; greater than the third breakpoint 120c, e.g., greater than 220 pixels, and less than the first breakpoint 120a, e.g., 620 pixels; or greater than the first breakpoint 120a, e.g., 620 pixels—a respective formatting rule is applied to the viewport space 114 that is associated with the corresponding interval 126a, 126b, 126c. Furthermore, the formatting rules generator 108 generators three formatting rules based on the second breakpoint 120b and the fourth breakpoint 120d that are associated with an appropriate corresponding interval 128a, 128b, 128c. In the illustrated example of FIG. 5, based on a height of the viewport space 114—less than the fourth breakpoint 120d, e.g., less than 100 pixels; greater than the fourth breakpoint 120d, e.g., greater than 100 pixels, and less than the second breakpoint 120b, e.g., 220 pixels; or greater than the second breakpoint 120b, e.g., 220 pixels—a respective formatting rule is applied to the viewport space 114 that is associated with the corresponding interval 128a, 128b, 128c Based on the viewport space 114 of FIG. 5 that is associated with three height-based breakpoints and three width-based breakpoints, nine distinct intervals are associated with the viewport space 114. Specifically, FIG. 6 illustrates an example two-dimensional representation 600 of the viewport space 114. Specifically, the viewport space 114 includes nine intervals (labeled 1, 2, . . . , 9) based on the four breakpoints 120a, 120b, 120c, 120c, with each of the intervals associated with a respective formatting rule. Furthermore, based on the size (e.g., height and width) of the viewport space 114, one of the formatting rules associated with the intervals is applied to the viewport space 114, and specifically the digital content item 116.

In some examples, the breakpoints are inclusive of a boundary established by the respective breakpoint. Specifically, in the illustrated example, interval 126a is inclusive of the boundary at 220 pixels. That is, when the viewport space 114 includes a width at 220 pixels, the formatting rule associated with the interval 126a is applied to the viewport space 114. Further, in the illustrated example, the interval 126b is established from a width of 221 pixels to 620 pixels and includes the boundary at 620 pixels. That is, when the viewport space 114 includes a width at 620 pixels, the formatting rule associated with the interval 126b is applied to the viewport space 114.

Referring to FIG. 1, in some implementations, the server computing system 102 distributes the digital content item 116 to the client computing device 104 for display by the client computing device 104 within an electronic document. In some examples, distribution of the digital content item 116 by the server computing system 102 includes the server computing system 102 providing to the client computing device 104 text or image content 130 of the digital content item 116 and formatting rules 132, e.g., the formatting rules associated with the intervals 126a, 126b, 126c, 128a, 128b, 128c. In some examples, by providing the formatting rules 132 to the client computing device 104 by the server computing system 102, the formatting rules 132 cause a client-side application (e.g., executing on the client computing device 104) to dynamically render and display an appropriate version of the digital content item 116. That is, the appropriate version of the digital content item 116 is based on a display area for which the digital content item 116 is to be displayed and the formatting rules.

For example, the client computing device 102 identifies the display area for presenting the digital content item 116, e.g., within an electronic document, and based on the formatting rules 132 and the display area, dynamically renders the digital content item 116 to display an appropriate version of the digital content item 116. In some examples, the client-side application can include a web browsing application and the electronic document can include a web page. Thus, based on the display area of the web page and/or the display area associated with display of the digital content item 116 within the web page, the web browsing application can dynamically render the digital content item 116 appropriately based on the formatting rules 132. In some examples, the display area of the web page and/or the display area associated with the display of the digital content item 116 within the web page can dynamically change, e.g., in response to maximizing the display area of a browser presenting the web page. As a result, the formatting rules applied to the digital content item 116 for display within the newly-sized web page can be dynamically updated by the client computing device 102 and based on the formatting rules 132, such that the digital content item 116 is appropriately displayed within the newly-sized web page.

Figure 7:
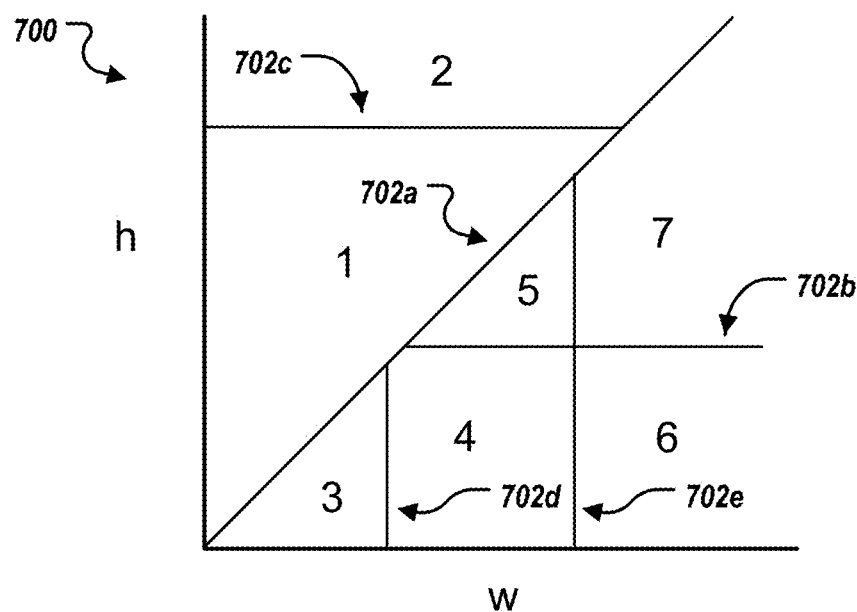

FIG. 7 illustrates an example two-dimensional representation 700 of the viewport space 114. Specifically, the viewport space 114 can include breakpoints based on a height, a width, and/or an aspect ratio of the viewport space 114. In particular, the viewport space 114 includes seven intervals (labeled 1, 2, . . . , 7) based on five breakpoints 702a, 702b, 702c, 702d, 702e (collectively referred to as breakpoints 702), with each interval associated with a respective formatting rule. To that end, based on the size (e.g., height and width) and the orientation of the viewport space 114, one of the formatting rules associated with the intervals is applied to the viewport space 114, and specifically, the digital content item 116. The breakpoint 702a is associated with an aspect ratio breakpoint in that an aspect ratio of the viewport space 114 greater than the breakpoint 702a is associated with a portrait orientation and that an aspect ratio of the viewport space 114 less than the breakpoint 702a is associated with a landscape orientation. The breakpoints 702b and 702c are associated with a height of the viewport space 114 (e.g., 400 pixels and 600 pixels, respectively), and the breakpoints 702d and 702e are associated with a width of the viewport space 114 (e.g., 200 pixels and 400 pixels, respectively). Additionally, each of the intervals are associated with a respective formatting rule. Thus, based on the size (e.g., height and width) and aspect ratio of the viewport space 114, one of the formatting rules associated with the appropriate interval is applied to the viewport space 114, and specifically the digital content item 116.

In the illustrated example, interval 1 is associated with an aspect ratio of the viewport space 114 greater than the breakpoint 702a (e.g., portrait landscape) and a height of the viewport space 114 less than the breakpoint 702b (e.g., less than 600 pixels). Interval 2 is associated with an aspect ratio of the viewport space 114 greater than the breakpoint 702a (e.g., portrait landscape) and a height of the viewport space 114 greater than the breakpoint 702b (e.g., greater than 600 pixels). Interval 3 is associated with an aspect ratio of the viewport space 114 less than the breakpoint 702a (e.g., landscape orientation) and a width of the viewport space 114 less than the breakpoint 702d (e.g., less than 200 pixels). Interval 4 is associated with an aspect ratio of the viewport space 114 less than the breakpoint 702a (e.g., landscape orientation), a width of the viewport space greater than the breakpoint 702d (e.g., 200 pixels) and less than the breakpoint 702e (e.g., 400 pixels), and a height of the viewport space less than the breakpoint 702c (e.g., 400 pixels). Interval 5 is associated with an aspect ratio of the viewport space 114 less than the breakpoint 702a (e.g., landscape orientation), a width of the viewport space 114 less than the breakpoint 702e (e.g., 400 pixels), and a height of the viewport space 114 greater than the breakpoint 702c (e.g., 400 pixels). Interval 6 is associated with an aspect ratio of the viewport space 114 less than the breakpoint 702a (e.g., landscape orientation), a width of the viewport space 114 greater than the breakpoint 702e (e.g., 400 pixels), and a height of the viewport space 114 less than the breakpoint 702c (e.g., 400 pixels). Interval 7 is associated with an aspect ratio of the viewport space 114 less than the breakpoint 702a (e.g., landscape orientation), a width of the viewport space 114 greater than the breakpoint 702e (e.g., 400 pixels), and a height of the viewport space 114 greater than the breakpoint 702c (e.g., 400 pixels).

In some examples, generating the breakpoints, by the breakpoint manager 108 and based on the user input, can include inserting a new breakpoint in the viewport space 114. FIG. 8 illustrates an example two-dimensional representation 800 of the viewport space 114, including insertion of a new breakpoint in the viewport space 114. Specifically, the breakpoint manager 108 generates the breakpoint 802 based on user input, with the breakpoint 802 partitioning the interval 3 into intervals 3a, 3b; interval 5 into intervals 5a, 5b; and interval 7 into intervals 7a, 7b. Additionally, each of the intervals 3a, 3b, 5a, 5b, 7a, 7b are associated with a respective formatting rule. In some examples, one of the newly created intervals (e.g., interval 3a) is associated with the formatting rule of the previous interval (e.g., interval 3) and the other newly created interval (e.g., interval 3b) is associated with a new formatting rule. Thus, based on the size (e.g., height and width) and aspect ratio of the viewport space 114, one of the formatting rules associated with the appropriate interval is applied to the viewport space 114, and specifically the digital content item 116.

In some examples, generating the breakpoints, by the breakpoint manager 108 and based on the user input, can include adding an aspect ratio split of the viewport space 114 based on an orientation of the digital content item 118. FIG. 9 illustrates an example two-dimensional representation 900 of the viewport space 114, including insertion of a new aspect ratio breakpoint in the viewport space 114. Specifically, the breakpoint manager 108 generates the breakpoint 902 based on user input, with the breakpoint 902 partitioning the interval 1 into intervals 1a, 1b; interval 2 into intervals 2a, 2b; and interval 6 into intervals 6a, 6b. Additionally, each of the intervals 1a, 1b, 2a, 2b, 6a, 6b are associated with a respective formatting rule. In some examples, one of the newly created intervals (e.g., interval 1a) is associated with the formatting rule of the previous interval (e.g., interval 1) and the other newly created interval (e.g., interval 1b) is associated with a new formatting rule. Thus, based on the size (e.g., height and width) and aspect ratio of the viewport space 114, one of the formatting rules associated with the intervals is applied to the viewport space 114, and specifically the digital content item 116. To that end, intervals 1a, 2a, 3, and 6a are associated with an aspect ratio of the viewport space 114 greater than the breakpoint 902 (e.g., portrait orientation) and intervals 1b, 2b, 4, 5, and 6b are associated with an aspect ratio of the viewport space 114 less than the breakpoint 902 (e.g., landscape orientation). In some examples, insertion of the breakpoint 902 by the breakpoint manager 108 can include one of the intervals 2a, 2b, 6a, 6b including a small portion, e.g., less than a pixel density, as illustrated by region 904. To that end, the value associated with the breakpoint 902 can be adjusted to minimize, if not prevent, such inclusion of one of the intervals including a negligible range of values.

In some examples, generating the breakpoints, by the breakpoint manager 108 and based on the user input, can include moving a previously existing breakpoint within the viewport space 114. FIG. 10 illustrates an example two-dimensional representation 1000 of the viewport space 114, including moving a previously existing breakpoint within the viewport space 114. Specifically, the breakpoint manager 108 moves the previously existing breakpoint 1002 based on user input. Thus, the boundaries associated with one or more intervals, and thus each formatting rule associated with the intervals, are adjusted. In some examples, moving the previously existing breakpoint within the viewport space 114 includes removing one or more intervals. In the illustrated example, the breakpoint 1002 is moved, that is, an aspect ratio associated with the breakpoint 1002 is adjusted. Thus, the intervals 3, 4, 7, 10 are removed from the viewport space 114. Furthermore, the boundaries associated with the intervals 1, 2, 5, 6, 9 are adjusted. In some examples, moving a previously existing breakpoint within the viewport space 114 includes adding one or more intervals. Specifically, in the illustrated example of FIG. 11, the breakpoint 1102 is moved, that is, an aspect ratio associated with the breakpoint 1102 is adjusted. Thus, the interval 7 is added to the viewport space 114. Furthermore, the boundaries associated with the intervals 1, 2, 3, 4, 6 are adjusted.

Figure 12:
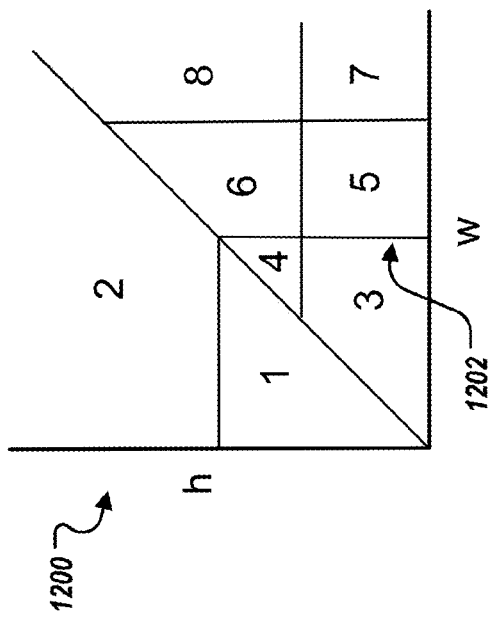
Figure 12:
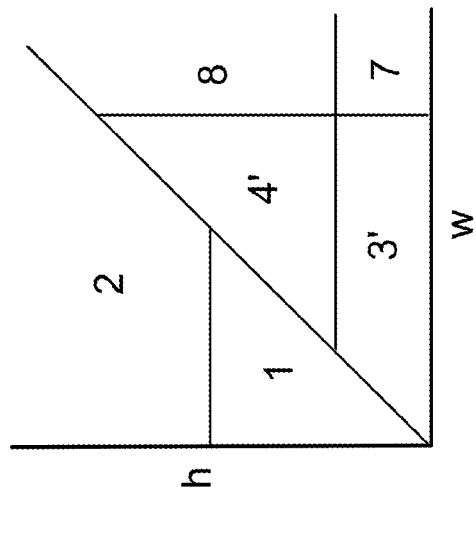

In some examples, generating the breakpoints, by the breakpoint manager 108 and based on the user input, can include deleting a previously existing breakpoint from the viewport space 114. FIG. 12 illustrates an example two-dimensional representation 1200 of the viewport space 114, including removing a previously exiting breakpoint from the viewport space 114. Specifically, the breakpoint manager 108 removes the previously existing breakpoint 1202 based on user input, with the intervals 4 and 6 merging to a single interval labeled 4', and intervals 3 and 5 merging to a single interval labeled 3'. To that end, the newly merged interval (e.g., interval 4') includes the formatting rules of one of the previous intervals (e.g., intervals 4, 6). Thus, based on the size (e.g., height and width) and aspect ratio of the viewport space 114, one of the formatting rules associated with the appropriate interval is applied to the viewport space 114, and specifically the digital content item 116.

Figure 13:
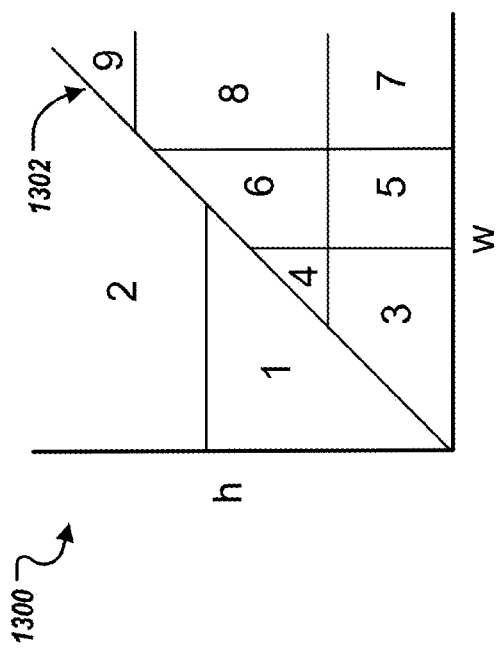
Figure 13:
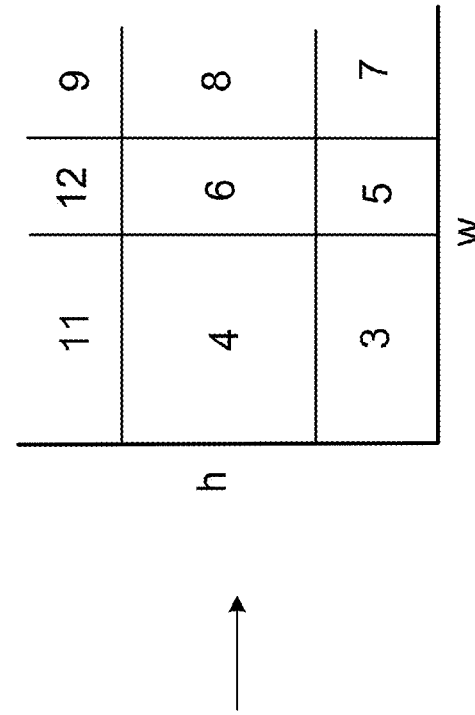

In some examples, generating the breakpoints, by the breakpoint manager 108 and based on the user input, can include removing a previously existing aspect ratio breakpoint of the viewport space 114. FIG. 13 illustrates an example two-dimensional representation 1300 of the viewport space 114, including removing a previously existing aspect ratio breakpoint of the viewport space 114. Specifically, the breakpoint manager 108 removes the previously existing aspect ratio breakpoint 1302 based on user input. As a result, one or more intervals (or portions of intervals) are merged with one or more other intervals (or portions of intervals); and/or one or more intervals are created. In the illustrated example, portions of interval 1 are merged with interval 3, 4, 6 and portions of interval 2 are merged with intervals 4, 6, 8, 9. Moreover, when the aspect ratio breakpoint 1302 is removed, one of the orientations (e.g., landscape or portrait) associated with the viewport space 114, as defined by the breakpoint 1302, is removed and the remaining orientation (e.g., landscape or portrait) is maintained. Furthermore, intervals 11 and 12 are created. Thus, based on the size (e.g., height and width) and aspect ratio of the viewport space 114, one of the formatting rules associated with the appropriate interval is applied to the viewport space 114, and specifically the digital content item 116.

Figure 14:
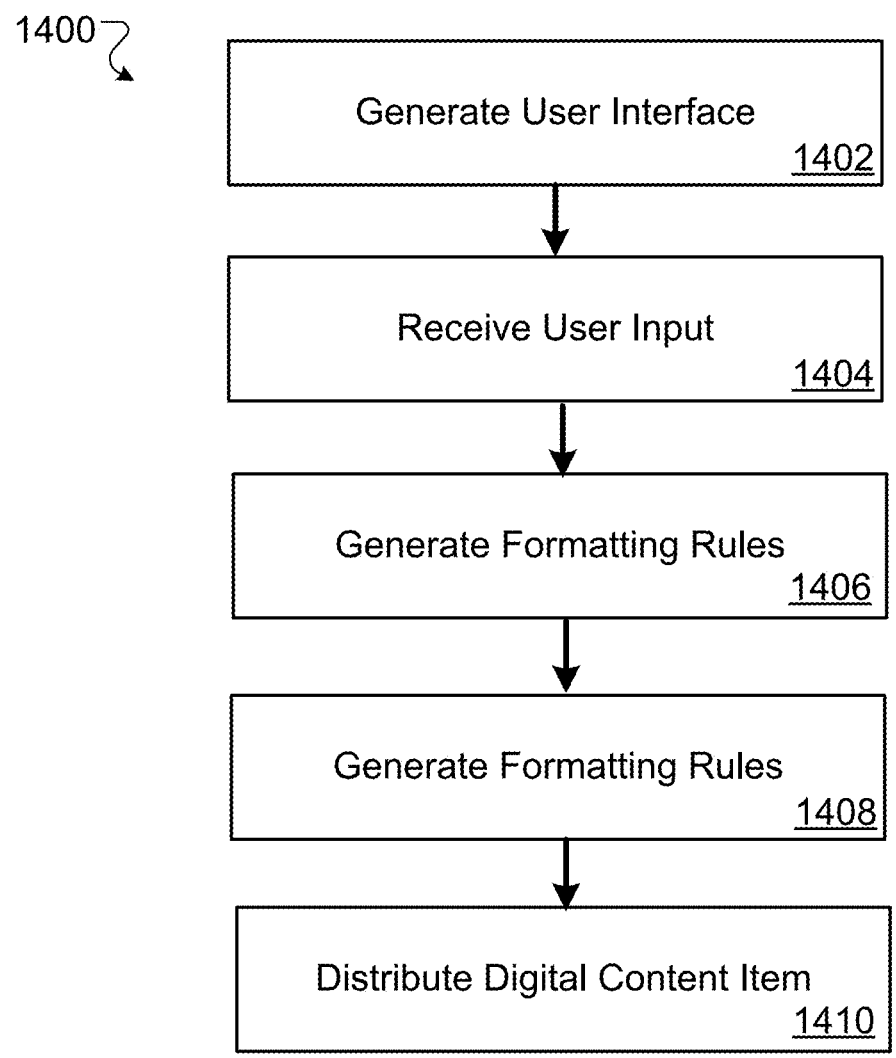
FIG. 14 depicts a flowchart of an example process for formatting the display of digital content.

FIG. 14 illustrates an example process 1400 for formatting display of digital content items. The process 1400 can be performed, for example, by the server computing system 102 and/or the client computing device 104, or another data processing apparatus. The process 1400 can also be implemented as instructions stored on computer storage medium, and execution of the instructions by one or more data processing apparatus cause the one or more data processing apparatus to perform some or all of the operations of the process 1400.

A user interface is generated that includes a viewport space of a digital content item (1402). For example, with reference to FIG. 1, the viewport space 114 is an area in which the digital content item 116 rendered for display, e.g., by the server computing system 102 and/or the client computing device 104. User input is received through a user interface (1404). For example, with reference to FIGS. 1 and 2, a user associated with the user interface 112 interacts with the user interface 112 (e.g., input via a keyboard, a mouse, touchscreen, or other) to provide the user input, and specifically, the user can interact with the viewport space 114 and/or the digital content item 116 to provide the user input.

Based on the user input, one or more breakpoints of the viewport space is generated (1406). For example, with reference to FIGS. 1 and 2, the breakpoint manager 108 generates the breakpoint 120a based on the user input. The breakpoint 120a is associated with a partition of the viewport space 114 into two or more intervals (or partitions). In some examples, the breakpoints are based on a height, a width, and/or an aspect ratio of the viewport space.

Based on the one or more breakpoints, two or more formatting rules are generated (1408). For example, with reference to FIGS. 1 and 2, based on the breakpoints, the formatting rules generator 108, generates formatting rules that each create a different version of the digital content item 116 when the formatting rule is applied. In some examples, each of the formatting rules creates a different version of the digital content item 116 when the formatting rule is applied. In some examples, different formatting rules are applied for different sized viewport spaces.

The digital content item is distributed to a client device for display within an electronic document (1410). For example, with reference to FIG. 1, the server computing system 102 distributes the digital content item 116 to the client computing device 104 for display by the client computing device 104 within an electronic document. In some examples, distribution of the digital content item 116 by the server computing system 102 includes the server computing system 102 providing to the client computing device 104 text or image content of the digital content item 116 and the formatting rules, e.g., the formatting rules associated with the intervals 126a, 126b, 126c, 128a, 128b, 128c. In some examples, by providing the formatting rules to the client computing device 104 by the server computing system 102, the formatting rules cause a client-side application (e.g., executing on the client computing device 104) to dynamically render and display an appropriate version of the digital content item 116. That is, the appropriate version of the digital content item 116 is based on a display area for which the digital content item 116 is to be displayed and the formatting rules.

Figure 15:
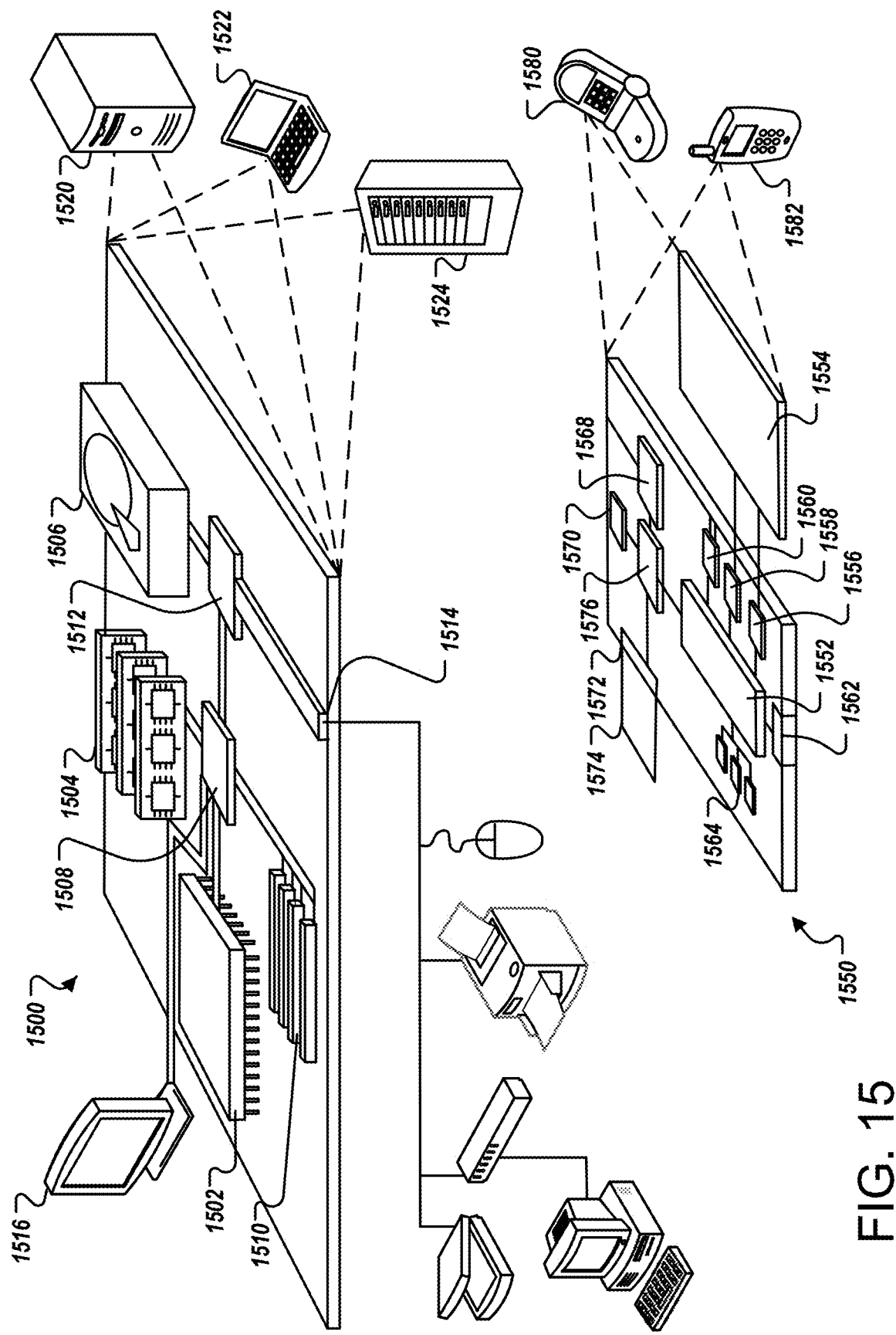
FIG. 15 depicts a flowchart of an example computing system and client computing device that may be used to implement the techniques described herein.

FIG. 15 shows an example of a generic computer device 1500 and a generic mobile computer device 1550, which may be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 may process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 1504, the storage device 1506, or a memory on processor 1502.

The high speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 668, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 may execute instructions within the computing device 1540, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1548 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 may be implemented as one or more of a computer-readable medium or media, a volatile memory unit or units, or a non-volatile memory unit or units. Expansion memory 1554 may also be provided and connected to device 1550 through expansion interface 1552, which may include, for example, a SIMM (Single In Line Memory Module) card interface. Such expansion memory 1554 may provide extra storage space for device 1550, or may also store applications or other information for device 1550. Specifically, expansion memory 1554 may include instructions to carry out or supplement the processes described above, and may include secure information also. Thus, for example, expansion memory 1554 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1554, memory on processor 1552, or a propagated signal that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS (Global Positioning System) receiver module 1550 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 660 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 680. It may also be implemented as part of a smartphone 1582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system comprising:
    a breakpoint manager that generates, based on user input to an user interface that includes a representation of a viewport space of a digital content item, one or more breakpoints of the viewport space based on a height, a width, or an aspect ratio of the viewport space; and
    a formatting rules generator that generates, based on the one or more breakpoints, two or more formatting rules that each create a different version of the digital content item when the formatting rule is applied, wherein different ones of the two or more formatting rules are applied for different sized viewport spaces,
    wherein the digital content item is distributed to a given client device for display within an electronic document, the distribution including providing, to the given client device, i) text or image content of the digital content item and the ii) the two or more formatting rules, wherein the two or more formatting rules cause a client-side application to dynamically render and display an appropriate version of the digital content item based on the two or more formatting rules and a size of a display area in which the digital content item is presented.

2. The system of claim 1, wherein at least one of the breakpoints is based on the width of the viewport space.

3. The system of claim 1, wherein the one or more breakpoints include respective breakpoints based on height, width, and aspect ratio of the viewport space.

4. The system of claim 1, wherein the breakpoint manager further generates two or more intervals of the viewport space based on the one or more breakpoints, each of the intervals independent of overlapping one another.

5. The system of claim 1, wherein each of the one or more breakpoints are inclusive of a boundary established by the respective breakpoint.

6. The system of claim 1, wherein the breakpoint manager generates the one or more breakpoints by inserting a new breakpoint in the viewport space, moving a previously existing breakpoint within the viewport space, or deleting a previously existing breakpoint from the viewport space.

7. The system of claim 1, wherein the breakpoint manager generates the one or more breakpoints by adding an aspect ratio breakpoint of the viewport space based on an orientation of the digital content item, or removing a previously existing aspect ratio breakpoint of the viewport space.

8. A computer-implemented method comprising:
generating, by one or more servers, a user interface that includes a viewport space of a digital content item;
receiving, by the one or more servers and through the user interface, user input;
generating, by the one or more severs and based on the user input, one or more breakpoints of the viewport space based on a height, a width, or an aspect ratio of the viewport space;
based on the one or more breakpoints, generating, by the one or more servers, two or more formatting rules that each create a different version of the digital content item when the formatting rule is applied, wherein different ones of the two or more formatting rules are applied for different sized viewport spaces; and
distributing, by the one or more servers and to a given client device, the digital content item for display within an electronic document, including providing, to the given client device, i) text or image content of the digital content item and the ii) the two or more formatting rules, wherein the two or more formatting rules cause a client-side application to dynamically render and display an appropriate version of the digital content item based on the two or more formatting rules and a size of a display area in which the digital content item is presented.

9. The computer-implemented method of claim 8, wherein at least one of the breakpoints is based on the width of the viewport space.

10. The computer-implemented method of claim 8, wherein the one or more breakpoints include respective breakpoints based on height, width, and aspect ratio of the viewport space.

11. The computer-implemented method of claim 8, further comprising generating, by the one or more servers, two or more intervals of the viewport space based on the one or more breakpoints, each of the intervals independent of overlapping one another.

12. The computer-implemented method of claim 8, wherein each of the one or more breakpoints are inclusive of a boundary established by the respective breakpoint.

13. The computer-implemented method of claim 8, wherein generating the one or more breakpoints includes inserting a new breakpoint in the viewport space, moving a previously existing breakpoint within the viewport space, or deleting a previously existing breakpoint from the viewport space.

14. The computer-implemented method of claim 8, wherein generating the one or more breakpoints includes adding an aspect ratio breakpoint of the viewport space based on an orientation of the digital content item, or removing a previously existing aspect ratio breakpoint of the viewport space.

15. A non-transitory computer-readable medium storing software comprising instructions executable by one or more computers which, upon such execution, cause the one or more computers to perform operations comprising:
generating, by one or more servers, a user interface that includes a viewport space of a digital content item;
receiving, by the one or more servers and through the user interface, user input;
generating, by the one or more severs and based on the user input, one or more breakpoints of the viewport space based on a height, a width, or an aspect ratio of the viewport space;
based on the one or more breakpoints, generating, by the one or more servers, two or more formatting rules that each create a different version of the digital content item when the formatting rule is applied, wherein different ones of the two or more formatting rules are applied for different sized viewport spaces; and
distributing, by the one or more servers and to a given client device, the digital content item for display within an electronic document, including providing, to the given client device, i) text or image content of the digital content item and the ii) the two or more formatting rules, wherein the two or more formatting rules cause a client-side application to dynamically render and display an appropriate version of the digital content item based on the two or more formatting rules and a size of a display area in which the digital content item is presented.

16. The computer-readable medium of claim 15, wherein at least one of the breakpoints is based on the width of the viewport space.

17. The computer-readable medium of claim 15, wherein the one or more breakpoints include respective breakpoints based on height, width, and aspect ratio of the viewport space.

18. The computer-readable medium of claim 15, the operations further comprising generating, by the one or more servers, two or more intervals of the viewport space based on the one or more breakpoints, each of the intervals independent of overlapping one another.

19. The computer-readable medium of claim 15, wherein each of the one or more breakpoints are inclusive of a boundary established by the respective breakpoint.

20. The computer-readable medium of claim 15, wherein generating the one or more breakpoints includes inserting a new breakpoint in the viewport space, moving a previously existing breakpoint within the viewport space, or deleting a previously existing breakpoint from the viewport space.

* * * * *